May 17, 1966 — M. C. HAIST — 3,251,565

AIRCRAFT ANTENNA DROGUES

Filed April 29, 1964

INVENTOR
MELVAL C. HAIST

BY Alexander & Dowell
ATTORNEYS

# United States Patent Office 3,251,565
Patented May 17, 1966

3,251,565
AIRCRAFT ANTENNA DROGUES
Melval C. Haist, Fort Lauderdale, Fla., assignor to Sunair Electronics, Inc., a corporation of Florida
Filed Apr. 29, 1964, Ser. No. 363,454
12 Claims. (Cl. 244—1)

This invention relates to improvements in drogues for use on drag-type aircraft antenna wires, or other towed slender lines, for the purpose of terminating the free end of the wire with means which will tension the wire and cause it to stably and smoothly track the aircraft when in extended position.

It is the principal object of the invention to provide a trailing-wire drogue which will tow stably at the end of an antenna wire without any tendency to wobble, oscillate or spin.

In the past, a wide variety of drag devices have been used in an effort to tension and stabilize the antenna wire, but they have suffered from a variety of defects. Prior art devices which spin during flight twist the wire so that when it is subsequently reeled in and/or out it tends to knot and snarl, so that in some cases, the wire twists until it breaks in flight. A swivel interposed between the antenna wire and the drag device is only partially effective to reduce wire-twisting. Prior art devices which wobble, oscillate or mutate subject the wire to severe tensions and to undue wear at the fairlead where the wire enters the aircraft, which wear results in early breakage and perhaps in dangerous loss of communication. Moreover, in the turbulent slip-stream immediately behind an aircraft, whipping occurs to an even greater extent while the antenna is being reeled in prior to landing, sometimes to such a degree that the antenna wire becomes entangled in the rudder and elevator assemblies of the tail.

The present invention provides a novel drogue which has had the benefit of extensive flight-testing using various shapes and weight distributions conducted to attain smooth and stable towing characteristics. There are several important requirements for stability: First, the locus of the air-resistance drag should be well behind the center of mass of the drogue with reference to the axial direction of flight; second, the rear surface of the drogue should be flat and should be disposed normal to the axis of flight. These two conditions, when met, provide a drogue which is free from wobble and oscillation. A third feature of improvement can be used to eliminate spin about said axis, namely: a weight of substantial proportions should be located eccentrically offset from the flight axis and below it. It is the object of this invention to provide a drogue embodying these features as well as other desirable features.

It is another purpose of this invention to provide a drogue which is so shaped and proportioned that it will provide adequate drag on the antenna at relatively low speeds, 50 or 60 miles per hour, but which will not provide excessive drag on the antenna of faster aircraft, for instance at about 250 miles per hour. Of course, the diameter of the body can be diminished for still higher speeds. The present invention will be described with reference to a drogue which is about 2½ inches in diameter and which is somewhat shorter in length than this dimension, and is generally conical in shape. This particular drogue weighs about eight ounces and provides a drag of approximately six pounds at 250 miles per hour as compared with a drag of about 15 pounds in some of the older style drogues. Excessive drag at relatively high speeds overloads the motor which drives the wire reel, and tends to blow fuses or burn up the motor, with the result that either the antenna must be jettisoned if possible, or else the aircraft must be slowed down approximately to its landing approach speed before the wire can be reeled in without risking overload of the motor.

When towed at its apex, the present shape is free from wobbling and oscillation, which fact is substantially contributed to by the flatness of the trailing surface of the drogue. Flight tests have indicated that any substantial rounding or lengthening behind the largest diameter of the cone tends to introduce wobble and oscillation, and thereby prevent true tracking. When the drogue was provided with a long extension beyond its widest diameter, wobbling resulted to such an extent that the pilot could see the drogue at the extreme amplitude of its oscillation when he looked out the side window of the aircraft, this drogue striking the aircraft fuselage and tail assemblies when it was reeled in, and this lashing about resulted in very severe wear of the wire entering the fairlead.

Most antenna fairleads include a collar into which the drogue should snuggly fit when the antenna is retracted to the position shown in Patent No. 2,986,733. A precise fit between the conical surface of the present body and the inner surface of the flared collar contributes to the smooth entry of the drogue into the fairlead without undue bending of the wire where it enters the drogue, and a snug fit prevents any tendency of the drogue to wobble after it has engaged the collar. The flight tests have further shown that if the weight is distributed symmetrically about the flight axis, there is a tendency for the drogue to rotate thereabout. However, when a weight is eccentrically included in the body so that it can reach equilibrium in a stable position beneath the flight axis, the eccentric weight serves to counteract the forces which would otherwise cause the drogue to spin. The flight-tested drogues were painted with strips of contrasting color so that any tendency to spin would be immediately apparent by visual inspection. The eccentric weight prevented such tendency.

It is another object of this invention to provide wire joining means capable of preventing chaffing of the wire where it enters the drogue and facilitating quick and easy connection of a drogue to a wire by extending the wire through the drogue entering at the apex of its cone, passing the wire through a small ball-like bushing, and then clamping a snug metal sleeve on the wire behind the bushing to captivate the latter on the wire. In this way, anyone can install the drogue using a pair of pliers, or even by merely striking the sleeve with a heavy object such as a hammer to pinch the wire within the sleeve.

Other objects and advantages of the invention will become apparent during the following discussion of the drawings, wherein.

Figure 2:
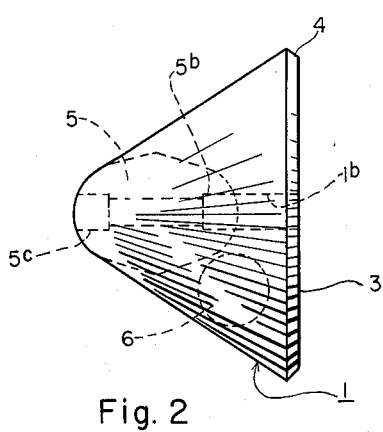
FIG. 2 is a side elevation of the drogue showing the bore therethrough and showing in dotted lines the location of the two weights within the drogue.
Figure 1:
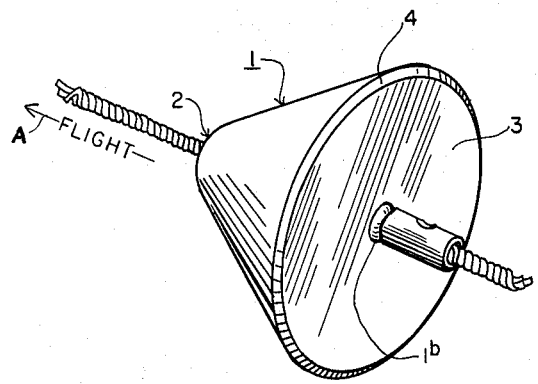
FIG. 1 is a perspective view of a drogue according to the present invention as viewed from a position slightly behind the drogue.
Figure 3:
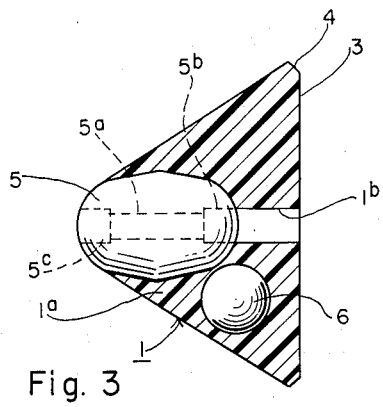
FIG. 3 is an axial section view taken through the drogue from the same viewing position as FIG. 2.
Figure 4:
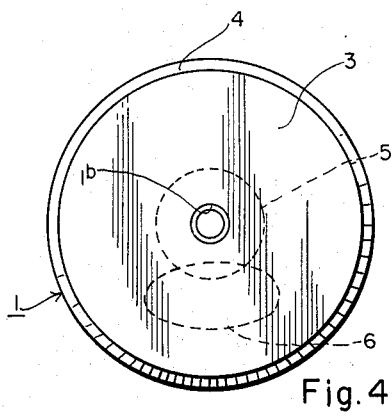
FIG. 4 is a rear elevation view of the drogue.
Figure 5:
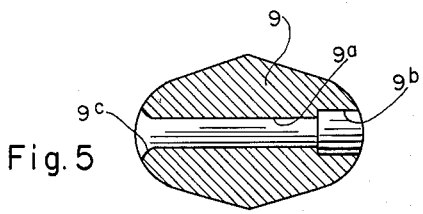
FIG. 5 is an axial section view of a modified form of the larger of the two weights.
Figure 6:
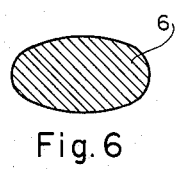
FIG. 6 is a section view through the smaller of the two weights.

Referring now to the drawing, FIG. 1 shows a drogue 1 according to the present invention and having a conical body tapering toward a rounded apex 2 located at the front end of the cone, and the body being sliced squarely off at the rear surface 3 of the cone, the surface 3 being disposed normal to the axis A of flight. A small radius or chamfer 4 may be provided to give the cone a finished appearance, although this radius should be so small as to not have any significant effect on the stability of the drogue in flight. Looking at FIGS. 2, 3 and 4, it will be seen that the main body of the drogue 1 is made of some rubber or plastic material 1a having good dimensional stability, and of such weight that there will be a considerable difference between the weight of the material of which the body is made, and the weight of the lead added to the body in the form of weights 5 and 6 embedded in the body material 1a. A material such as nylon or styrene foam would be good for this purpose, for instance. The weight 5 should be comparatively large, and should have sufficient mass that it moves the center of mass of the composite drogue body well forward of the axial center of the bore through the body. A weight in the shape of a fishing sinker has been found satisfactory for both weights 5 and 6, cross-sections of suitable weights being shown in FIGS. 5 and 6, and these weights being made of lead.

Figure 7:
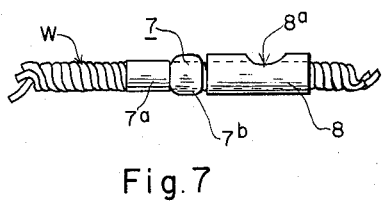
FIG. 7 is a somewhat enlarged view of an antenna wire having a bushing and sleeve thereon for captivating the drogue on the end of the antenna wire.

A preferred way of attaching the drogue to the wire W is to pass the wire through the axial bore in the body from the apex through the flat surface 3 and behind the drogue. A bushing 7 is then slid onto the wire, FIG. 7, this bushing having a cylindrical forward portion 7a sized to slide into the small diameter portion 5a of the bore of the weight 5, and the bushing having a larger rear ball portion 7b sized to slide within the larger rear portion 1b and 5b of the bore and seat upon the shoulder where the bore steps down in diameter. A metal sleeve 8 is then passed over the end of the antenna wire W and is crimped as shown at 8a to mash the sleeve against the wire and captivate the former on the latter. In the absence of the sleeve 8 a knot could be tied in the wire behind the bushing 7. The front of the weight 5 may have a short portion of the bore 5c enlarged in diameter and adapted to receive another bushing or sleeve which could be placed upon the wire so that it enters the bore 5c and tends to reduce wear at that point. Another satisfactory solution to the problem of wear of the wire at the apex of the cone can be provided by using a weight 9 in place of the weight 5. The weight 9 is similar to the weight 5 and includes a small diameter bore 9a, a larger diameter bore 9b at the rear of the weight, but the bore at the front of the weight is cleared as at 9c.

The eccentric weight 6 is shown in the figures as being losenge-shaped, although the shape is not particularly important. It is entirely possible to make both weights unitary so that the weight 6 would merely be an eccentric mass on one side of the weight 5. Undoubtedly other suitable structures differing in physical shape from the present exemplary structures can be conceived.

Another possibility, especially when the body portion 1a is made of rubber or neoprene, is to load the lead particles selectively into the forward and lower portion of the rubber cone to provide a structure in which the weight is concentrated in the forward lower portion of the drogue, although the drogue itself would appear to the casual observer to be of homogeneous construction.

The present invention is not to be limited to the specific examples mentioned, for obviously changes may be made within the scope of the following claims.

I claim:

1. A drogue to be fixed to the free end of a trailing-wire antenna, comprising
   (a) a body to be fixed at its axial front end to the antenna, said body flaring outwardly toward its rear end to place the preponderance of windage drag to the rear of its axial center; and
   (b) said body being weighted near its front end so that its center of mass is located forward of said axial center.

2. In a drogue as set forth in claim 1, means eccentrically attached to said body to displace said center of mass radially off to one side from said axis.

3. A drogue to be supported on the end of a trailing-wire antenna, comprising
   (a) a body having a longitudinal axis;
   (b) means for attaching the body to the wire at one end of said axis, the body being enlarged at the other end of the axis and tapering down toward said one end; and
   (c) weighting means in the body located near said one end, and causing the center of gravity of the body to be located closer to said one end than to the other.

4. In a drogue as set forth in claim 3, means eccentrically attached to said body to displace said center of mass radially off to one side from said axis.

5. A droque to be fixed to the free end of a trailing-wire antenna, comprising
   (a) a body having a longitudinal axis extending from the front end of the body to the rear end;
   (b) means for coupling the body to the antenna for towing in the axial direction;
   (c) the body being cross-sectionally largest at its rear end and tapering down toward its front end and the rear end comprising a flat surface disposed in a radial plane; and
   (d) means with the body for heavily weighting the front end to place the center of mass of the body axially forward of its longitudinal center.

6. In a drogue as set forth in claim 5, means eccentrically attached to said body to displace said center of mass radially off to one side from said axis.

7. A drogue adapted to be towed through a fluid medium to provide resistance to motion therethrough due to fluid turbulence, comprising
   (a) a body having an axis extending in the towing direction, the body being cross-sectional smaller at its front end and larger at its rear end and terminating in a flat surface at its rear end disposed normal to said axis; and
   (b) the body being made of a relatively lighter material at said larger rear end and a relatively heavier material at said smaller front end, whereby the greater weight is located forward of the center of the axis and the greater towing resistance is to the rear of said center.

8. In a drogue as set forth in claim 7, the exterior shape of said body being symmetrical in radial planes about said axis.

9. In a drogue as set forth in claim 7, said body being conical about said axis.

10. In a drogue as set forth in claim 7, means eccentrically attached to said body to displace said center of mass radially off to one side from said axis.

11. A drogue to be fixed to the free end of a towed slender line comprising
    (a) a body having an axial bore therethrough sized to receive said line, the body being substantially conical about said bore and having its larger end terminate in a plane surface normal to said bore, its smaller end facing in the towing direction;

(b) the body having an enlarged portion of the bore extending through said plane surface;
(c) means for making an enlargement in said line receivable in said enlarged portion;
(d) first weighting means in said body near the smaller conical end for establishing the center of mass of the body near that end; and
(e) second weighting means in said body radially offset from the axis for establishing the center of mass of the body off to one side of said axial bore.

12. In a drogue as set forth in claim 11, said means for making an enlargement including a bushing on said line and sized to enter said enlarged bore and means to captivate said bushing on said line.

References Cited by the Examiner
UNITED STATES PATENTS

| 2,287,257 | 6/1942 | Lear | 244—1 |
| 3,214,115 | 10/1965 | Price | 244—1 |

FERGUS S. MIDDLETON, *Primary Examiner.*